United States Patent Office 3,381,779
Patented May 7, 1968

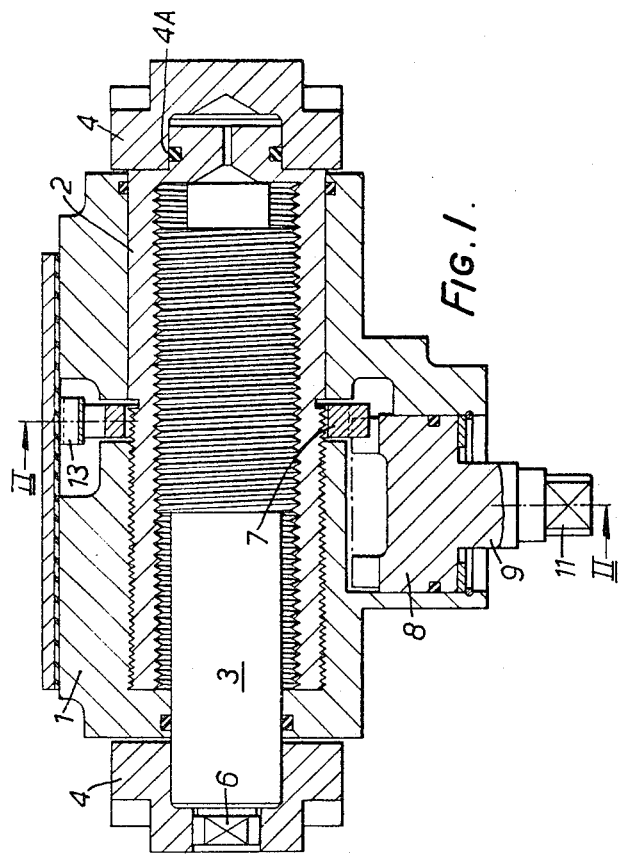
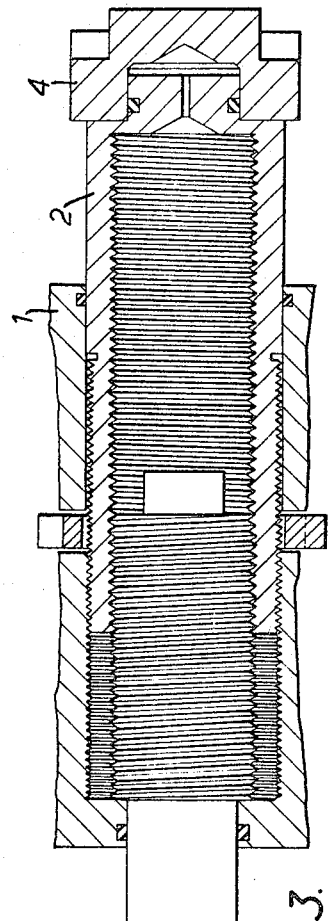

3,381,779
BRAKE ADJUSTER MECHANISMS
Charles Newstead, Birmingham, England,
assignor to Girling Limited
Filed Sept. 30, 1966, Ser. No. 583,487
Claims priority, application Great Britain, Sept. 3, 1965,
37,868/65
5 Claims. (Cl. 188—79.5)

ABSTRACT OF THE DISCLOSURE

An adjuster for drum brakes including a housing having a screw-threaded bore, a sleeve having screw-threaded engagement in the bore, a shaft within the sleeve in screw-threaded engagement therewith, the screw-threads between the housing and the sleeve and between the sleeve and the shaft being of the same hand. A ring gear rotates the sleeve relative to the housing and the shaft to produce axial displacement of the shaft and sleeve in opposite directions, relative to the housing, the sleeve and the shaft at their outer ends abutting the adjacent ends of the brake shoes.

---

This invention relates to brake adjuster mechanisms for drum brakes.

Various forms of adjuster have previously been proposed which rely on a screw mechanism to provide separation of the shoe ends of a drum brake, but the prior proposals of which we are aware have been undesirably complicated with respect to the number or form of the principal components, or have had exposed screw-threaded members (which are all liable to corrosion and to grit interfering with the free running of the mechanism) or both.

The present invention provides a new and improved form of adjuster mechanism which is simple in construction, and yet readily protected against the effects of corrosion or grit.

The invention consists broadly in the provision of a brake adjuster mechanism for a drum brake, comprising a housing having a screw-threaded bore, a sleeve having screw-threaded engagement in the bore, a shaft within the sleeve in screw-threaded engagement therewith, the screw-threads between the housing and the sleeve and between the sleeve and the shaft being of the same hand, and means for rotating the sleeve relative to the housing and the shaft to produce axial displacement of the shaft and sleeve in opposite directions, relative to the housing. In use, the adjuster will, of course, be installed so that the sleeve and shaft at their outer ends abut (directly or through the intermediary of tappets or equivalent members) the adjacent ends of the brake shoes.

Sealing of the screw-threaded portions of the mechanism is readily achieved by providing the sleeve and shaft with plain external portions which extend through seals in the opposite ends of the housing.

Preferably, the pitch of the screw-threads between the shaft and the sleeve is twice that of the threads between the sleeve and the housing, so that with the housing fixed, say to the back plate or other fixed structure of the brake, rotation of the sleeve will produce axial movement of the sleeve and shaft in opposite directions but at equal velocity.

One constructional form of the invention will now be described, by way of example only, with reference to the accompanying drawings, in which:

FIGURE 1 is an axial section of the adjuster mechanism;

FIGURE 2 is a section on the line II—II of FIGURE 1; and

FIGURE 3 is a scrap axial section showing the principal parts in another position of adjustment.

The mechanism comprises a housing 1 having a screw-threaded bore in which is threadedly engaged a sleeve 2. The sleeve is also internally screw-threaded, and receives a shaft 3 having threaded engagement in the sleeve. The sleeve 2 and shaft 3 project from opposite ends of the housing and at their outer ends engage tappets 4 for abutting brake shoes. The sleeve is rotatable relative to the housing but the shaft is prevented from rotating by a square section spigot 6 engaged in a square hole in the adjacent tappet, which in turn is held against rotation by its engagement with the shoe end. The left hand tappet may in some cases be omitted and the shaft engages the shoe direct. The outer end of the sleeve 2 is rotatable in the adjacent tappet, and we prefer to provide a running seal 4A and to grease the inside of the tappet on assembly to reduce resistance to rotation of the sleeve.

The screw-threads between the housing 1 and the sleeve 2, and between the sleeve and the shaft 3 are the same hand but the second has twice the pitch of the first, so that rotation of the sleeve relative to the housing and the shaft will produce axial displacement of the sleeve and the shaft in opposite directions, but at equal velocity, relative to the housing. It should, however, be noted that a ratio other than 2:1 could be employed to compensate, for example, for unequal wear of the brake shoes.

The means for effecting rotation of the sleeve conveniently comprises a ring gear 7 which is located in a recess in the housing and has a key or keys which are slidably received in one or more longitudinal keyways in the sleeve 2. Meshing with the ring gear 7 is a face gear 8 which is rotatable by means of a spigot 9 having a squared end 11. When the adjuster is mounted upon the brake back-plate, the spigot 9 projects transversely through the back-plate, so as to be readily accessible for adjustment. A click-spring 13 engages between the teeth of the ring gear to render adjustments audible and to prevent vibration causing unwanted adjustment.

In FIGURE 1 the sleeve and shaft are shown in their intermost positions, and in FIGURE 3 they are shown in their fully extended positions, in which the screw threads on the shaft abut one end wall of the housing (so that accidental separation of the parts due to over-adjustment is prevented, and the sleeve still has a substantial part of its threaded length in engagement with the housing and the shaft, respectively, so that the tappets are firmly supported. Also, the screw threaded portions are contained wholly within the housing in all positions of adjustment.

The various openings in the housing are sealed by gaskets or sliding seals, as appropriate, to ensure the exclusion of liquids, grit or other undesirable materials from the screw-threads. The construction described above is particularly advantageous in that sealing is achieved very simply and completely and does not involve sealing of any threaded members. The adjuster is therefore free-running to facilitate manual adjustment, so that the operator can feel a substantial increase in resistance to rotation of the face gear when the parts reach the limit of their travel, as for example when the shoes abut the brake drum. The adjuster is sufficiently robust in construction to withstand the normal torques exerted on it in normal operation, but as an additional safeguard, the face gear is designed to fail in preference to the ring gear under conditions of excess torque, and is releasably retained in its hole through the housing by a split spring ring so that even if the face gear fails, it can easily be removed and replaced. Upon removal of the face gear, the ring gear can even be rotated by inserting a screw-driver or other tool through the hole to engage the teeth of the ring gear.

It will also be noted that the arrangement of the screw threaded parts one within the other leads to a very compact arrangement, having regard to the substantial degree of mutual guiding and support between the parts.

In view of the fact that the mechanism runs freely, it may alternatively be actuated automatically, in response to excess travel of a brake shoe upon braking, indicating that adjustment is required. The mechanism for effecting automatic adjustment may comprise a lever pivoted on the housing and connected by a flexible cable to one brake shoe, the excess rotation of the lever upon brake application operating through a ratchet mechanism to rotate the ring gears. If automatic adjustment is provided, the face gear may be spring biased out of engagement with the ring gear, so that it must be forced in against the spring to permit manual adjustment to be effected. Inward movement of the face gear also acts to release temporarily the ratchet of the automatic mechanism, for example by means of push rods acting to displace a part of the ratchet device.

Other modifications will, of course, be possible within the scope of the invention. For example, the screw-threaded portion of the bore of the housing may be formed in a tubular insert which is passed laterally through the side of the housing on assembly, and secured in position.

I claim:
1. A brake adjuster mechanism for a drum brake of the type having a pair of opposing brake shoes engageable with the drum to apply the brake, comprising a housing having a screw-threaded bore, a sleeve having screw threaded engagement in said bore and having an end part projecting outwardly of said housing for engagement with one brake shoe, a shaft in said sleeve in screw-threaded engagement therewith and having an end part projecting outwardly of said housing opposite the end of said sleeve for engagement with the other of said shoes, said bore and said shaft having screw threads of the same hand, and means for rotating said sleeve relative to said housing and said shaft to produce axial displacement of said shaft and said sleeve in opposite directions, relative to said housing.

2. A brake adjuster mechanism as claimed in claim 1, wherein said screw-threaded bore has a thread pitch twice that of said shaft.

3. A brake adjuster mechanism as claimed in claim 1, wherein said sleeve and said shaft each have a plain external portion projecting from said housing, and said housing has sealing means making sealing engagement with said portions, the screw threads of said sleeve and shaft being contained wholly within said housing in all positions of adjustment.

4. A brake adjuster mechanism as claimed in claim 1, wherein said means for rotating said sleeve comprises a ring gear slidably keyed to said sleeve, a face gear meshing with said ring gear, and means rotatably mounting said face gear on said housing.

5. A brake adjuster mechanism as claimed in claim 4, comprising means defining an aperture in said housing, and releasable means for retaining said face gear in said aperture, whereby said face gear can be removed and said ring gear rotated by means of a tool inserted through said aperture, and wherein said face gear is designed to fail in preference to said ring gear under conditions of excessive torque.

References Cited

UNITED STATES PATENTS

| | | | |
|---|---|---|---|
| 1,926,379 | 9/1933 | Goepfrich | 188—79.5 |
| 2,060,879 | 11/1936 | La Brie | 188—79.5 |

DUANE A. REGER, *Primary Examiner.*